US012809804B2

(12) United States Patent
Monta et al.

(10) Patent No.: US 12,809,804 B2
(45) Date of Patent: Nov. 24, 2026

(54) DATA STORAGE SYSTEM AND DATA STORING METHOD

(71) Applicant: Panasonic Automotive Systems Co., Ltd., Kanagawa (JP)

(72) Inventors: Hiroki Monta, Osaka (JP); Yoshiteru Hayashi, Hyogo (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 101 days.

(21) Appl. No.: 18/972,290

(22) Filed: Dec. 6, 2024

(65) Prior Publication Data

US 2025/0199974 A1 Jun. 19, 2025

(30) Foreign Application Priority Data

Dec. 19, 2023 (JP) ................................ 2023-213752
Jun. 28, 2024 (JP) ................................ 2024-104845

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC ............................ G06F 13/28; G06F 2213/28
See application file for complete search history.

(56) References Cited

U.S. PATENT DOCUMENTS 5,958,066 A * 9/1999 Kedem ............... G06F 11/2221 711/100
2006/0155904 A1* 7/2006 Murakami .......... G06F 13/1663 710/240
2017/0168970 A1* 6/2017 Sajeepa .................. G06F 13/24
2021/0073162 A1* 3/2021 Ahn .................... G06F 13/4031

(Continued)

FOREIGN PATENT DOCUMENTS

JP 2021-174413 11/2021
JP 2022-038688 3/2022
JP 2023-145314 10/2023

OTHER PUBLICATIONS

Goto, "General Introduction of CXL, Next-generation Interconnect Standard that evolved PCI express", The 2022 First Seminar on Latest Technology Trends, Oct. 2022, together with a partial English language translation.

(Continued)

*Primary Examiner* — Farley Abad
(74) *Attorney, Agent, or Firm* — Greenblum & Bernstein, P.L.C.

(57) ABSTRACT

A data storage system is a data storage system provided in a mobile entity, and includes a shared storage device, a control device (such as a first host) capable of writing to the shared storage device, one or more devices each capable of writing data to the shared storage device without the control device, and a priority controller connected between control device and each of the one or more devices and the shared storage device to perform control of write of data from the (Continued)

control device and the one or more devices to the shared storage device based on a first priority degree set to the control device or a second device included in the one or more devices and a second priority degree that is set by the control device and indicates a priority degree of write by a first device included in the one or more devices.

13 Claims, 6 Drawing Sheets

(56) References Cited

U.S. PATENT DOCUMENTS

| | | | | |
|---|---|---|---|---|
| 2021/0406199 | A1* | 12/2021 | Kounavis | G06F 12/063 |
| 2022/0066636 | A1 | 3/2022 | Taki | |
| 2023/0063930 | A1 | 3/2023 | Ichida et al. | |
| 2023/0305719 | A1 | 9/2023 | Monta et al. | |

OTHER PUBLICATIONS

Wagh, "Introducing Compute Express Link™ (CXL™) 3.0: Expanding Fabric Capabilities and Management", The 19th annual OpenFabrics Alliance (OFA) Workshop, Apr. 2023.

* cited by examiner

FIG. 3

| VC | Priority degree | Access classification | Device | Processing classification | Examples of content of processing |
|---|---|---|---|---|---|
| 7 | High | ASIL write | First device | Event log recording | Record log before and after risk is detected in detection of obstacle |
| 6 | | | Second device | Event recording | Record video and image for analysis of detection before and after risk is detected in detection of obstacle |
| 5 | | Non-ASIL write | Second device | Full-time video recording | Record driving video |
| 4 | | | First device | Full-time log recording | Driving log (such as position information) |
| 3 | | | | | Own vehicle information (such as state of vehicle) |
| 2 | | | | | State of passenger (such as blood pressure) |
| 1 | | Communication | — | Download | Software update |
| 0 | Low | | | | Management data from server |

DATA STORAGE SYSTEM AND DATA STORING METHOD

CROSS REFERENCE TO RELATED APPLICATIONS

The present application is based on and claims priority of Japanese Patent Application No. 2023-213752 filed on Dec. 19, 2023, and Japanese Patent Application No. 2024-104845 filed on Jun. 28, 2024.

FIELD

The present disclosure relates to a data storage system and a data storing method.

BACKGROUND

Conventionally, data, such as logs and videos obtained in occurrences of predetermined events such as collision and emergency brake in vehicles and during normal times, is stored in data storing portions (storage devices). When the vehicle is a vehicle having autonomous driving functions, an enormous amount of data should be stored. Thus, Japanese Patent Literature (PTL) 1 discloses a technique of reducing an amount of stored data by changing a target of data recording to a data storing portion according to the level of an autonomous driving mode.

CITATION LIST

Patent Literature

PTL 1: Japanese Unexamined Patent Application Publication No. 2021-174413

SUMMARY

However, the technique according to PTL 1 can be improved upon.

In view of this, the present disclosure provides a data storage system and a data storing method capable of improving upon the above related art.

The data storage system according to one aspect of the present disclosure is a data storage system provided in a mobile entity, the data storage system including: a shared storage device; a control device capable of writing to the shared storage device; one or more devices each capable of writing data to the shared storage device without the control device; and a priority controller that is connected between (i) the control device and (ii) the one or more devices and the shared storage device to perform control concerning write of data from the control device and the one or more devices to the shared storage device based on a first priority degree set to the control device or a second device included in the one or more devices and a second priority degree that is set by the control device and indicates a priority degree of write by a first device included in the one or more devices.

The data storing method according to one aspect of the present disclosure is a data storing method to be executed by a data storage system provided in a mobile entity, the data storage system including: a shared storage device; a control device capable of writing to the shared storage device; and one or more devices each capable of writing data to the shared storage device without the control device, the data storing method including: performing control concerning write of data from the control device and the one or more devices to the shared storage device based on a first priority degree set to the control device or a second device included in the one or more devices and a second priority degree that is set by the control device and indicates a priority degree of write by a first device included in the one or more devices.

A data storage system and the like according to one aspect of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a diagram illustrating one example of the VC setting table according to the embodiment.

DESCRIPTION OF EMBODIMENTS

Circumstances Leading to the Present Disclosure

Figure 1:
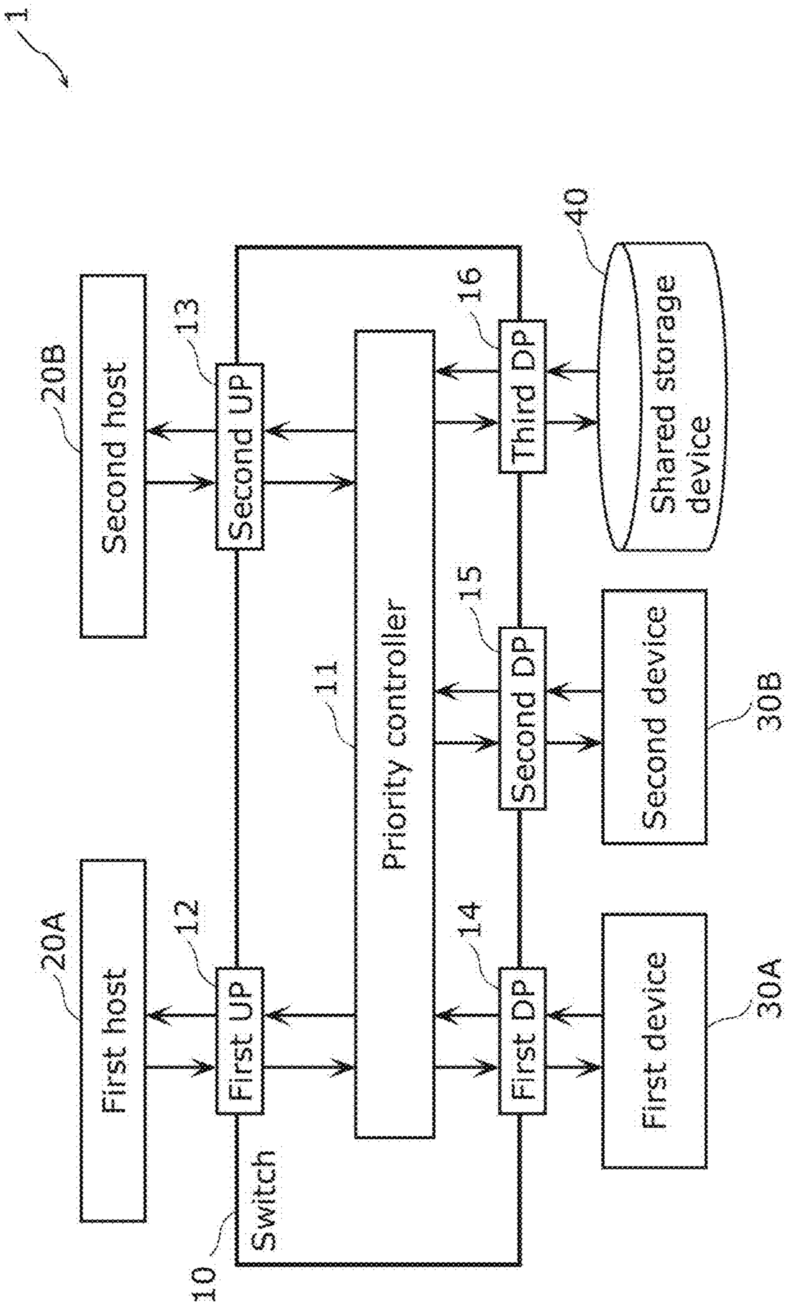
FIG. 1 is a block diagram illustrating a functional configuration of the data storage system according to an embodiment.

A shared storage device provided in a vehicle has been examined, in which a plurality of hosts and a plurality of devices can store data in a shared manner. However, in such a shared storage device of the vehicle, when write accesses of data to the shared storage device from a plurality of hosts and a plurality of devices crash, data concerning the driving of the vehicle may be lost. For this reason, in a data storage system that stores data in a mobile entity such as a vehicle, it is desired to suppress loss of the data concerning the driving of the vehicle.

The data concerning the driving of the vehicle includes data to be obtained in the vehicle, such as results of sensing by sensors provided in the vehicle and a variety of logs. The data concerning the driving of the vehicle includes data of high safety risks during the driving of the vehicle. For example, the data of high safety risks during the driving of the vehicle may be data needed for safe driving of the vehicle, or may be data needed when an external analyst analyzes the state of the vehicle.

The crash of the write access means that two or more of hosts and devices simultaneously execute a write access to the shared storage device. The term "simultaneous(ly)" encompasses not only complete simultaneousness, but also a time difference within a predetermined time (e.g., substantially simultaneous).

To address this, for a technique of suppressing loss of the data of high safety risks during the driving of the vehicle during crash of write accesses to shared storage device from a plurality of hosts (such as a plurality of ECUs), the present applicant applied Japanese Unexamined Patent Application Publication No. 2023-145314 as a prior patent application concerning the device by the present applicant. The prior patent application discloses that assignment of priority in consideration of a safety risk during driving of the vehicle is applied to the virtual channel (VC) of Peripheral Component Interconnect express (PCIe) (registered trademark). The assignment of the priority may be applied to the VC of Compute Express Link (CXL) (registered trademark).

Thus, in the present disclosure, as a technique concerning the data storage system in which loss of the data concerning the driving of the vehicle is suppressed, a technique of suppressing loss of the data of high safety risks during the driving of the vehicle when write accesses from a plurality of devices to the shared storage device crash and when write accesses from a device and a host to the shared storage device crash will be mainly described.

Note that PTL 1 does not disclose a technique of suppressing loss of data when write accesses crash.

Hereinafter, embodiments will be specifically described with reference to the drawings.

The embodiments described below all illustrate general or specific examples. Numeric values, shapes, components, arrangement positions of components and connection forms thereof, steps, order of steps, and the like shown in the embodiment below are exemplary, and should not be construed as limitations to the present disclosure. Moreover, among the components of the embodiments below, the components not described in an independent claim will be described as optional components.

In the drawings, identical referential numerals are given in substantially identical configurations, and overlapping description will be omitted or simplified.

In this specification, terms expressing relations between entities, such as "same", and numeric values and numeric value ranges are expressions also including substantially identical ranges, such as a difference of about several percentage (or about 10%), rather than expressions representing only strict meanings.

In this specification, unless otherwise specified, ordinals such as "first" and "second" do not mean the number or the order of components, and are used to avoid confusion of components of the same type and distinguish these components.

EMBODIMENT

Hereinafter, the data storage system and the data storing method according to the present embodiment will be described with reference to FIGS. 1 to 5.

[1. Configuration of Data Storage System]

FIG. 1 is a block diagram illustrating a functional configuration of data storage system 1 according to the present embodiment.

Data storage system 1 is a system provided in a mobile entity such as a vehicle, a flying body (e.g., drone), a ship, or a railroad train to store data in movement of the mobile entity. Hereinafter, an example in which data storage system 1 is provided in a vehicle will be described.

As illustrated in FIG. 1, data storage system 1 includes switch 10, first host 20A, second host 20B, first device 30A, second device 30B, and shared storage device 40. Hereinafter, an example in which PCIe is used as an interface in data storage system 1 will be described.

Switch 10 is also referred to as PCIe switch, and has a function to distribute (switching) data output from first host 20A and second host 20B to end-point devices downstream (in the example in FIG. 1, first device 30A, second device 30B, and shared storage device 40).

For example, when data is output from first host 20A to first device 30A, switch 10 obtains the data from first host 20A via first upstream port 12 (hereinafter, also referred to as first UP 12), and distributes (outputs) the obtained data to first device 30A via first downstream port 14 (hereinafter, also referred to as first DP 14). In other words, switch 10 communicably connects first host 20A and first device 30A. The data may contain the content of processing to be executed by first device 30A and the VC, for example.

For example, when data is written (stored) from second host 20B to shared storage device 40, switch 10 obtains the data from second host 20B via second upstream port 13 (hereinafter, also referred to as second UP 13), and distributes (writes) the obtained data to shared storage device 40 via third downstream port 16 (hereinafter, also referred to as third DP 16). In other words, switch 10 communicably connects second host 20B and shared storage device 40.

Switch 10 includes priority controller 11, first UP 12, second UP 13, first DP 14, second downstream port 15 (hereinafter, also referred to as second DP 15), and third DP 16.

Preference controller 11 is connected between (i) a plurality of hosts and (ii) a plurality of devices and shared storage device 40 to control write of data from each of the hosts and the devices to shared storage device 40. When write accesses of data to shared storage device 40 crash, priority controller 11 controls the priority order of the data to be written to shared storage device 40. Specifically, priority controller 11 performs control (priority control) to preferentially write one item of data selected according to the value of VC to shared storage device 40. In the present embodiment, for example, priority controller 11 controls write of data from each of the hosts and the devices to shared storage device 40 by round robin control.

First UP 12 is an upstream port connected to first host 20A and priority controller 11.

Second UP 13 is an upstream port connected to second host 20B and priority controller 11.

First DP 14 is a downstream port connected to first device 30A and priority controller 11. First DP 14 may include a memory that stores the VC (one example of the second priority degree) set to first device 30A (or own device). The memory is implemented by a semiconductor memory, for example.

Second DP 15 is a downstream port connected to second device 30B and priority controller 11. Second DP 15 may include a memory that stores the VC (one example of the first priority degree) set to second device 30B (or own device). The memory is implemented by a semiconductor memory, for example.

Third DP 16 is a downstream port connected to shared storage device 40 and priority controller 11.

First host 20A and second host 20B are one examples of the control device, are components (such as circuits) that function as hosts data communication (i.e., PCIe communication) via a PCIe bus, and correspond to root complex devices in the PCIe standard. First host 20A and second host 20B may have a configuration including functional configuration portions implemented by a central processing unit (CPU) or a micro processor unit (MPU) to execute processing, and a memory that stores programs for causing the functional configuration portions to execute a variety of processing, such as a read only memory (ROM) or a random access memory (RAM), for example. First host 20A and second host 20B may be implemented by an electronic control unit (ECU) provided in a vehicle, for example.

Data storage system 1 can include any number of hosts, and may include at least only one of first host 20A or second host 20B (i.e., only one host), or may include three or more hosts.

First host 20A includes one or more master portions (not illustrated) that are processors connected to first UP 12 of switch 10 to execute processing to write different items of data to shared storage device 40. Examples of the different items of data include event logs concerning events inside the vehicle, videos concerning events inside the vehicle, and downloaded information. In other words, examples of the processing to be executed each of the one or more master portions include recording of event logs, recording of videos, and download (recording of downloaded information).

Second host 20B includes one or more master portions (not illustrated) that are processors connected to second UP 13 of switch 10 to execute processing to write different items of data to shared storage device 40. Examples of the different items of data include event logs concerning events inside the vehicle, videos concerning events inside the vehicle, and downloaded information. In other words, examples of the processing to be executed each of the one or more master portions include recording of event logs, recording of videos, and download (recording of downloaded information).

When first host 20A and second host 20B each write the data to shared storage device 40, each host stores the VC (value of the VC) set to the host (or the DP to which the host is connected) in a traffic class (TC) storing portion (TC field) in the header of the data, and outputs the data containing the VC.

First device 30A and second device 30B are one examples of a plurality of devices connected to a PCIe bus, and correspond to end-point devices in the PCIe standard, for example. First device 30A and second device 30B are implemented by an input/output device, for example. First device 30A and second device 30B may have a configuration including functional configuration portions, such as a CPU or an MPU, to execute processing, and a memory, such as a ROM or a RAM, that stores programs for causing the functional configuration portions to execute a variety of processing. First device 30A and second device 30B may be cameras, sonars, networks, General-Purpose computing on Graphics Processing Units (GPGPU), or the like.

Data storage system 1 can include any number of devices, and may include at least only one of first device 30A or second device 30B (i.e., only one device), or may include three or more devices.

First device 30A and second device 30B may each include a memory (not illustrated) that obtains the VC set to the own device from the host, and stores the obtained VC. The memory is implemented by a semiconductor memory, for example.

First device 30A and second device 30B can write the data to shared storage device 40 without first host 20A and second host 20B. In other words, data storage system 1 has a structure that enables direct communication between end-point devices connected to the PCIe bus. Here, the enabling of direct communication means that the end-point devices communicate with each other without the host.

Thus, in the access from first device 30A and second device 30B to shared storage device 40, the data can be transferred by Peer to Peer (P2P) without the host. In other words, first device 30A and second device 30B each transfer the data using a method in which the VC is unnecessary. For example, first device 30A and second device 30B may each transfer the data to shared storage device 40 by direct memory access (DMA) transfer.

In this case, an appropriate VC may not be set to the devices. Thus, in the present embodiment, the host sets the VCs of the devices. The setting of the VC will be described later with reference to FIG. 2.

Shared storage device 40 is a memory device that is connected to the hosts and the devices, and allows write of items of data from the hosts and the devices. For example, shared storage device 40 corresponds to the end-point device in the PCIe standards. In the present embodiment, shared storage device 40 is a non-volatile memory device. For example, shared storage device 40 has a configuration including a substrate and a plurality of non-volatile semiconductor memories arranged on the substrate.

Data storage system 1 may also include one or more memories (such as temporary memories) (not illustrated) for suppressing loss of data which is waited for access by priority controller 11 (data not selected). Priority controller 11 may temporarily store the data not selected in the memory, may write the selected data to shared storage device 40, and then write the data stored in the memory to shared storage device 40. The data written in shared storage device 40 is deleted from the memory. The memory is implemented by a volatile semiconductor memory, for example.

[2. Operation of Data Storage System]

Figure 2:
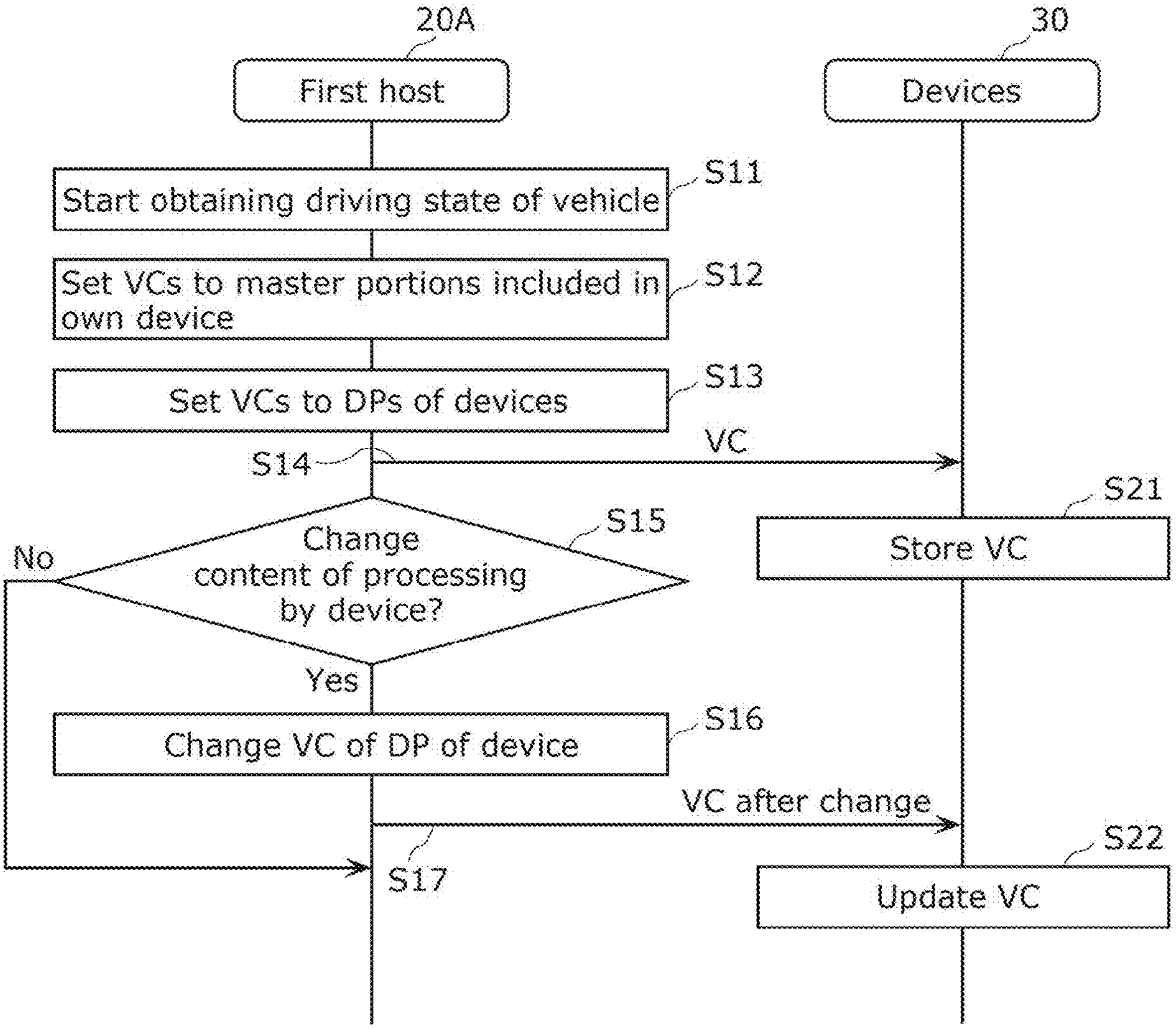
FIG. 2 is a sequence diagram illustrating an operation of set a VC in the data storage system according to the embodiment.

Subsequently, the operation of data storage system 1 having the above-mentioned configuration will be described with reference to FIGS. 2 to 5. First, setting of the VC (value of the VC) of the devices by the host will be described with reference to FIGS. 2 and 3. FIG. 2 is a sequence diagram illustrating the operation of setting the VC (data storing method) in data storage system 1 according to the present embodiment. FIG. 2 illustrates an example in which first host 20A sets the VCs of devices 30. Devices 30 include first device 30A and second device 30B, for example. The setting of the VC means the setting of the value of the VC.

As illustrated in FIG. 2, first, first host 20A starts obtaining the driving state of the vehicle (one example of the state of the mobile entity) (S11). For example, first host 20A may obtain the driving state from at least one of devices 30. In step S11, the hosts may start obtaining the driving state of the vehicle. In step S12 and thereafter, the driving state of the vehicle is obtained at every predetermined time interval.

Next, the hosts each set the VCs of the master portions included in the own device based on the driving state of the vehicle and a table for setting the VCs (see FIG. 3 described later) (S12). Specifically, first host 20A sets the VCs of the master portions included in the own device, based on the driving state of the vehicle and a table for setting the VCs. Likewise, second host 20B sets the VCs of the master portions included in the own device, based on the driving state of the vehicle and the table for setting the VCs. Note that one host (e.g., first host 20A) may determine the contents of processing to be executed by the master portions in a different host other than the own device, and may set the VCs according to the determined contents of processing, based on the VC setting table. In this case, first host 20A outputs the VCs set for the different host.

FIG. 3 is a diagram illustrating one example of the VC setting table according to the present embodiment. The VC setting table illustrated in FIG. 3 is a VC setting table used in a shared manner in the setting of the VCs in data storage system 1, for example. The VC setting table may be stored in a memory (not illustrated) included in each of the hosts, or may be stored in shared storage device 40. The VC setting table is one example of a shared table for setting a first priority degree to a third priority degree.

As illustrated in FIG. 3, the VC setting table is a table in which the VC, the priority degree, the access classification, the device, the processing classification, and the content of processing are associated.

The VC is information used in determination of the priority order in priority controller 11. In the example illustrated in FIG. 3, 8 levels of 0 to 7 are set. Levels 0 to 7 are one example of the values of the VC.

The priority degree indicates a priority degree (such as high or low) in write of the data to shared storage device 40 for each access classification. FIG. 3 illustrates an example in which the priority degree is higher as the value of the VC is greater. For example, when the data in automotive safety integrity level (ASIL) write and the data in non-ASIL crash, FIG. 3 shows that the data in the ASIL write is written to shared storage device 40 with higher priority. For example, FIG. 3 shows that a higher priority degree is set as the data is more important for safety of the vehicle.

"Access classification" indicates the classification of the processing to write the data, which includes ASIL write, Non-ASIL write, and Communication (communication write). "ASIL write" indicates an access concerning safety (write of the data concerning safety), "Non-ASIL write" indicates an access not concerning safety (write of the data not concerning safety), and "Communication" indicates a download access (write of data downloaded) from a server apparatus outside the vehicle.

"Device" indicates information for identifying device 30. In the configuration illustrated in FIG. 1, "Device" indicates information for identifying first device 30A, second device 30B, or the like.

"Processing classification" indicates a classification of processing to the data for each access classification, and includes event log recording, event recording, full-time video recording, full-time log recording, and download.

The event log recording and the event recording are included in the ASIL write under the access classification. "Event log recording" is recording of logs of events concerning the safety of the vehicle in shared storage device 40, and includes recording of logs before and after a risk is detected in detection of an obstacle, for example, as illustrated in an example of the content of processing. "Event recording" is recording of videos of events concerning the safety of the vehicle, and includes recording of videos before and after a risk is detected in detection of an obstacle or images for detection analysis, for example, as illustrated in the example of the content of processing.

The full-time video recording and the full-time log recording are included in the non-ASIL write under the access classification. "Full-time video recording" is full-time recording of videos not concerning safety, and includes recording of driving videos, for example. "Full-time log recording" is full-time recording of logs not concerning safety, and includes driving logs (such as position information), own vehicle information (such as the state of the vehicle), and the state of the passenger (such as blood pressure), for example.

"Download" is included in "Communication". "Download" indicates download of information from a server outside the vehicle, and includes software update such as Over-The-Air (OTA) and management data from a server apparatus, for example, as illustrated in the example of the content of processing.

The VC setting table illustrated in FIG. 3 is illustrative, and it may include "Entertainment", "HW (hardware) function", and the like in the access classification, for example. Since "Entertainment" has a low safety risk in driving of the vehicle, a VC of 0 to 1 may be set according to the content of processing, for example. For the "HW function", the VC may be set according to the content of processing.

Thus, the value of the VC, that is, the priority degree is set for each processing classification, rather than for each access classification. For example, in the case of the VC setting table illustrated in FIG. 3, when a write access of event log recording and a write access of event recording crash, priority is given to the write access of event log recording having a greater value of the VC (having a higher priority degree).

Based on the VC setting table illustrated in FIG. 3, VCs are assigned to the master portions of the hosts. When the VCs are set to the master portions of the hosts, the item "Device" illustrated in FIG. 3 may be neglected.

Because the target data to be treated in each of the master portions is preliminarily determined, a VC setting table including the value of the VC according to the target data to be treated is preliminarily prepared. When first host 20A includes first to third master portions, the data treated by the first master portion is data of an event log, the data treated by the second master portion is data of event recording, and the data treated by the third master portion is data of full-time log (driving log), first host 20A sets the value of the VC to "7" in the first master portion, to "6" in the second master portion, and to "4" in the third master portion.

Again with reference to FIG. 2, next, based on the driving state of the vehicle and the VC setting table, first host 20A sets the VCs to the DPs of devices 30 (S13). First host 20A determines the content of processing to be executed by each of devices 30 according to the driving state of the vehicle, and sets the VC according to the content of processing determined, based on the VC setting table. The VC setting table used in step S13 is the same table (e.g., the VC setting table illustrated in FIG. 3) as the VC setting table used in step S12. In other words, the VCs of the master portions of the hosts and the VCs of devices 30 are set based on the same table (i.e., the same reference).

Here, the setting of the VC when first device 30A is a data processing device and second device 30B is a device that inputs data from a camera or a sensor will be described. When based on the driving state of the vehicle, occurrence of an event having a high safety risk in driving of the vehicle is detected and event log recording is assigned to first device 30A as a processing classification, first host 20A sets the value of the VC of first device 30A to "7". Likewise, first host 20A assigns event recording as the processing classification of second device 30B, and then first host 20A sets the value of the VC of second device 30B to "6". Examples of events having a high safety risk in driving of the vehicle include, but should not be limited to, occurrence of emergency brake, and detection of an approaching object, and any other events may be set. For example, the events are preliminarily set.

When based on the driving state of the vehicle, first host 20A assigns full-time log recording as the processing classification to first device 30A in a situation where an event having a high safety risk does not occur in driving of the vehicle (for example, in normal time), first host 20A sets the value of the VC of first device 30A to any value of "2 to 4" according to the content of processing. Likewise, when first host 20A assigns full-time video recording as the processing classification of second device 30B, first host 20A sets the value of the VC of second device 30B to "5".

Thus, first host 20A may be configured to be capable of setting the contents of processing and the VCs for the master portions of own device and those for devices 30 according to the driving state of the vehicle. In other words, first host 20A may dynamically change the VCs for the master portions of own device and devices 30 according to the driving state of the vehicle. The hosts may set the VCs of devices 30 in charge. For example, first host 20A may set the VC of at least one device (e.g., first device 30A).

Next, first host 20A outputs the set VCs to devices 30 in addition to the contents of processing (S14). In step S14, first host 20A notifies of devices 30 of the contents of processing and the VCs through PCIe communication, for example. Devices 30 store the obtained VCs in addition to the contents of processing (S21). The VC may be stored in a memory included in device 30 itself, or may be stored in a memory included in a DP connected to device 30.

Next, for devices 30, first host 20A determines whether to change the content of processing of each device 30, based on the driving state (for example, a change in driving state) (S15). For example, when the driving state transits from one of occurrence of an event having a high safety risk, non-occurrence of an event having a high safety risk, and occurrence of a event having a low safety risk to the other thereof, first host 20A may determine to change the content of processing by the device. The criterion for the determination indicating whether first host 20A changes the content of processing may be set for each device 30. Thus, first host 20A determines to change the contents of processing to be executed by devices 30, based on the driving state of the vehicle.

Next, when first host 20A determines to change the content of processing by device 30 (Yes in S15), first host 20A changes of the VC of the DP of device 30 (S16). In other words, first host 20A resets (updates the VC of device 30 based on the driving state of the vehicle at this timing and the VC setting table. When first host 20A determines not to change the content of processing by device 30 (No in S15), first host 20A does not perform processing to update the content of processing by device 30 and the VC.

Next, first host 20A outputs the VC after the change to device 30 in addition to the content of processing after the change (S17). In step S17, first host 20A notifies device 30 of the content of processing and VC after the change through PCIe communication, for example. Device 30 also stores the obtained VC, that is, updates the stored VC (value of the VC) (S22). Thus, when first host 20A determines to change the content of processing by device 30, first host 20A further updates the VCs (one examples of the second priority degree and the third priority degree) of device 30 according to the content of processing after the change.

Thus, the content of processing and the VC according to the driving state of the vehicle at that time are set to each of devices 30. The update of the content of processing and the VC may be periodically executed during driving of the vehicle.

Figure 4:
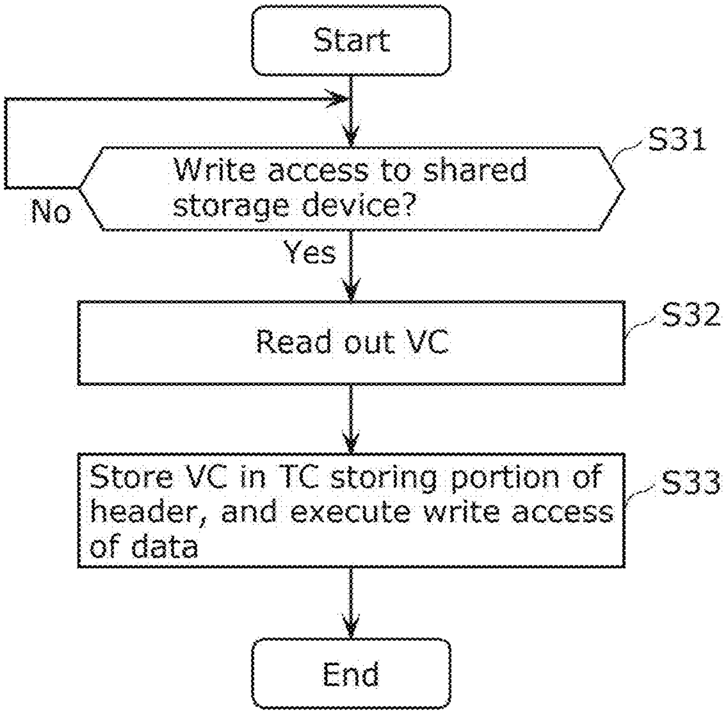
FIG. 4 is a flowchart illustrating an operation of a device according to the embodiment.

Subsequently, the operation of device 30 will be described with reference to FIG. 4. FIG. 4 is a flowchart illustrating the operation of device 30 (data storing method) according to the present embodiment. Hereinafter, the operation of first device 30A will be described with reference to FIG. 4.

As illustrated in FIG. 4, first device 30A determines whether to perform a write access to shared storage device 40 (S31). For example, when the timing to execute the content of processing set by first host 20A comes, first device 30A determines to perform a write access to shared storage device 40.

Next, when first device 30A determines to perform a write access to shared storage device 40 (Yes in S31), first device 30A reads out the VC (value of the VC) set to the own device from the memory (S32). For example, first device 30A obtains the VC by reading out the VC from the memory. When first device 30A determines not to perform a write access to shared storage device 40 (No in S31), the processing returns to step S31, and continues.

Next, first device 30A stores the VC obtained in step S32 in the TC storing portion of the header of the data, and performs a write access of the data, which stores the VC, to shared storage device 40 (S33). First device 30A stores the value of the VC in the TC storing portion of the header, which is unnecessary information for outputting the data to shared storage device 40 by P2P, and performs a write access.

Thereby, when the write access to shared storage device 40 is performed, priority controller 11 can determine, based on the VC of the crashed data, which data is written to shared storage device 40 with priority because the VCs are included in items of data from the hosts and devices 30, the items of data being input to priority controller 11.

When the DP stores the VC of device 30, the processing in steps S32 and S33 may be executed by the DP. For example, the DP may obtain the VC of device 30 stored in the memory of the own device by reading out the VC from the memory, may store the VC in the TC storing portion of the header of the data output from device 30, and may output the data, which stores the VC, to shared storage device 40 via priority controller 11. In other words, the VC may be stored in the TC storing portion of the header in the DP, rather than in the TC storing portion of the header of the data from device 30.

Figure 5:
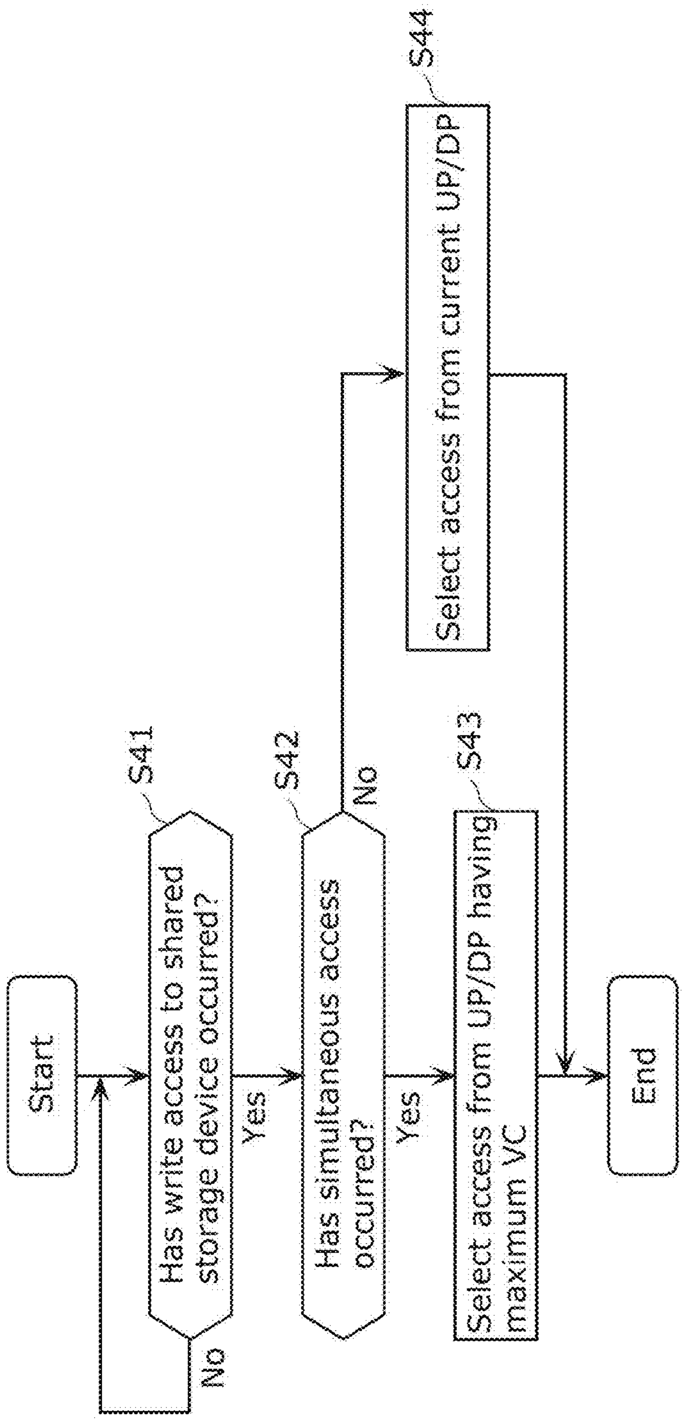
FIG. 5 is a flowchart illustrating an operation of a priority controller according to the embodiment.

Subsequently, the operation of priority controller 11 will be described with reference to FIG. 5. FIG. 5 is a flowchart illustrating the operation of priority controller 11 (data storing method) according to the present embodiment.

As illustrated in FIG. 5, priority controller 11 determines whether a write access to shared storage device 40 has occurred (S41). When priority controller 11 determines that the write access has occurred (Yes in S41), the processing goes to step S42. When priority controller 11 determines that the write access has not occurred (No in S41), the processing returns to step S41, and continues.

Next, when priority controller 11 determines that the write access has occurred, it further determines whether a simultaneous access has occurred (S42). In step S42, priority controller 11 determines whether write accesses to shared storage device 40 have crashed.

Next, when priority controller 11 determines that the simultaneous access has occurred (Yes in S42), priority controller 11 selects an access from UP/DP having the maximum VC contained in the data among the accesses that have caused the simultaneous access (S43). In other words, when a simultaneous access has occurred, priority controller 11 gives priority to an access having the maximum VC among two or more accesses that have caused the simultaneous access, and outputs the data corresponding to the access to shared storage device 40 with priority, thereby writing the data to shared storage device 40. Priority controller 11 obtains the values of the VCs stored in the TC storing portions of the headers of items of the data which have caused the simultaneous access, and performs determination in step S43.

For example, when write accesses of data to shared storage device 40 have simultaneously occurred from one of the hosts and one of devices 30, priority controller 11 may select one of the one of the hosts or the one of devices 30 based on the first priority degree and the second priority degree, and may write the data from the one selected to shared storage device 40 with priority. For example, when write accesses of data to shared storage device 40 have simultaneously occurred from two or more devices 30 among devices 30, priority controller 11 may select one of two or more devices 30 based on the priority degrees of two or more devices 30, and may write the data from the selected one of devices 30 to shared storage device 40 with priority. In this case, the priority degree of one device 30 of two or more devices 30 is one example of the first priority degree, and the priority degree of another one of two or more devices 30 is one example of the second priority degree.

When priority controller 11 determines that a simultaneous access has not occurred (No in S42), priority controller 11 selects the access from current UP/DP (S44) because there is only one access to shared storage device 40. In other words, when the simultaneous access has not occurred, priority controller 11 outputs the data corresponding to the obtained access to shared storage device 40, thereby writing the data to shared storage device 40 without using the VC.

Thus, in data storage system 1, by performing priority control concerning the write access to shared storage device 40 using the VCs assigned to devices 30 and the VCs assigned to the master portions of the hosts, loss of data of high safety risks during the driving of the vehicle can be suppressed when write accesses to shared storage device 40 crash.

When write accesses from host and device 30 having the same value of the VC crash, priority controller 11 may determine that priority is given to the write access from the host. When write accesses from the hosts having the same value of the VC crash or when write accesses from devices 30 having the same value of the VC crash, priority controller 11 may perform priority control according to the priority order preliminarily set.

In the present embodiment, the operation of priority controller 11 has been described in the case where write accesses of data to shared storage device 40 have simultaneously occurred from one of hosts and one of devices 30 and in the case where data write accesses to shared storage device 40 have simultaneously occurred from two or more of devices 30. However, in addition to or instead of these two cases, priority controller 11 according to the present disclosure may perform control of write to shared storage device 40 based on the values of the VC stored in the TC storing portions of items of data from the hosts in the case where write accesses of data to shared storage device 40 have simultaneously occurred from the hosts.

Example of Modification of Embodiment

Hereinafter, the data storage system according to the present modification will be described with reference to FIG. 6. Hereinafter, differences from the embodiment will be mainly described, and contents identical or similar to those of the embodiment will be omitted or simplified.

Figure 6:
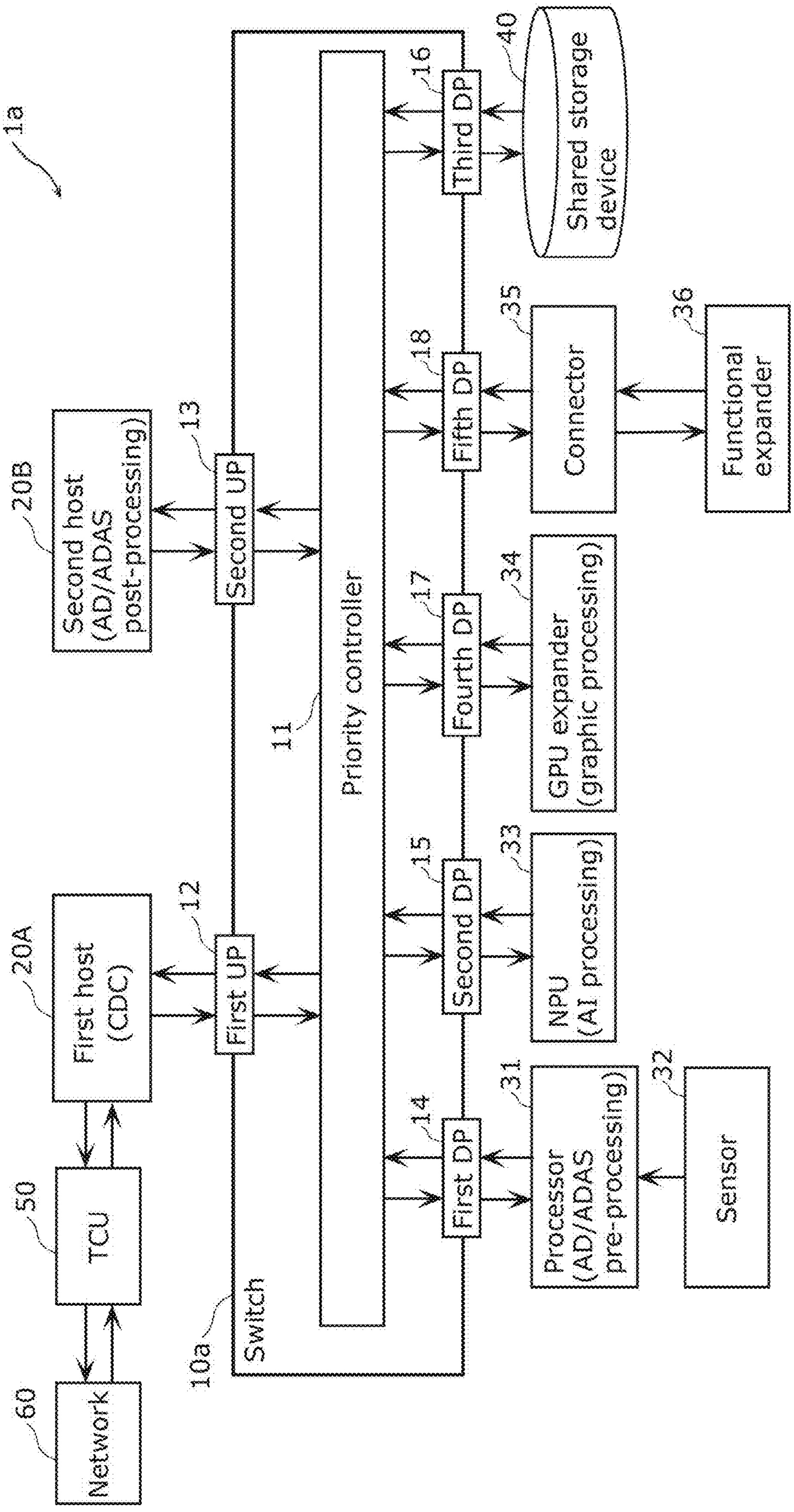
FIG. 6 is a block diagram illustrating a functional configuration of the data storage system according to a modification of the embodiment.

FIG. 6 is a block diagram illustrating a functional configuration of data storage system 1*a* according to the present modification. FIG. 6 illustrates a configuration of Example in which data storage system 1*a* is implemented by high-performance computing (HPC).

As illustrated in FIG. 6, data storage system 1*a* includes switch 10*a*, first host 20A, second host 20B, devices 30, shared storage device 40, telematic control unit (TCU) 50, and network 60.

Switch 10*a* includes switch 10 according to the embodiment, fourth downstream port 17 (hereinafter, also referred to as fourth DP 17), and fifth downstream port 18 (hereinafter, also referred to as fifth DP 18).

Fourth DP 17 is a downstream port connected to graphics processing unit (GPU) expander 34 and priority controller 11. Fourth DP 17 includes a memory that stores the VC set to GPU expander 34 (or own device). The memory is implemented by a semiconductor memory, for example.

Fifth DP 18 is a downstream port connected to connector 35 (functional expander 36 via connector 35) and priority controller 11. Fifth DP 18 may include a memory that stores the VC set to connector 35 (or functional expander 36). The memory is implemented by a semiconductor memory, for example.

In the present modification, first host 20A functions as a cockpit domain controller (CDC). The CDC is an in-vehicle computer for integrally controlling a group of cockpit products such as an in-vehicle infotainment (IVI), a meter, a head up display (HUD), and a passenger monitoring system.

First host 20A writes data (fourth data) obtained via TCU 50, such as program update, information update from a server apparatus, and information obtained the Internet, to shared storage device 40. Thereby, the software of the vehicle can be updated through wireless communication, and the software can be easily upgraded, for example.

In the present modification, second host 20B functions as a post-processor of autonomous driving (AD)/advanced driver-assistance systems (ADAS). Second host 20B executes predetermined post-processing on information used to control AD/ADAS. The predetermined post-processing is preliminarily set, for example.

Devices 30 each include processor 31, network processing unit (NPU) 33, GPU expander 34, and connector 35.

Processor 31 obtains data from sensor 32 (such as a camera) for driving or monitoring a passenger, executes a predetermined pre-processing on the obtained data, and writes data (first data) subjected to the predetermined pre-processing to shared storage device 40. When the data is an image, the predetermined pre-processing is image processing, for example, but can be any other processing. The predetermined pre-processing is preliminarily set. Processor 31 corresponds to first device 30A illustrated in FIG. 1, for example. Processor 31 may have a configuration including functional configuration portions such as a CPU or an MPU and a memory for causing the functional configuration portions to execute a variety of processing.

Sensor 32 is a sensor attached to the vehicle to measure surroundings of the vehicle or the inside thereof. The sensor is a camera or Light Detection And Ranging (LIDAR), for example, but it can be any other sensor.

NPU 33 performs AI processing on predetermined data, for example. The predetermined data is first data, for example. The AI processing is not particularly limited, and may be object detection processing, for example. NPU 33 corresponds to second device 30B illustrated in FIG. 1. NPU 33 may have a configuration including functional configuration portions such as a CPU or an MPU and a memory for causing the functional configuration portions to execute a variety of processing.

In addition to NPU 33, second host 20B also performs predetermined post-processing on the first data. Part of data (second data) obtained by subjecting the first data to the processing by NPU 33 and second host 20B and used to control AD/ADAS in the vehicle is written to shared storage device 40. Part of data (third data) obtained by subjecting the first data to the processing by NPU 33 and second host 20B and used to control monitoring of a passenger with the cockpit is written to shared storage device 40.

GPU expander 34 performs graphic processing for expanding a graphic display or function, and writes data (fifth data) subjected to the processing to shared storage device 40. GPU expander 34 may have a configuration including functional configuration portions such as a GPU and a memory for causing the functional configuration portions to execute a variety of processing.

Connector 35 is a connector for connecting switch 10*a* and functional expander 36.

Functional expander 36 is a device externally provided via connector 35 to expand the function of data storage system 1*a*. Functional expander 36 may be an external device for entertainment, for example. Functional expander 36 writes predetermined data (sixth data) according to the extension of the function to shared storage device 40.

TCU 50 is a communication unit for performing bidirectional information communication between the vehicle and the outside (for example, performing bidirectional communication via OTA), which is connected to first host 20A and includes a communication interface with network 60 outside the vehicle. TCU 50 transmits information notified by first host 20A to an external apparatus (such as a server apparatus) via network 60. TCU 50 receives data such as program update, information update from a server apparatus, and information obtained from the Internet (e.g., weather and traffic information) from the external apparatus.

Network 60 is a communication network that communicably connects the vehicle and the external apparatus. For example, a communication network such as the Internet can be used, but any other communication network can be used.

As described above, in data storage system 1*a*, write accesses for storing first data to sixth data from the hosts and devices 30 to shared storage device 40 are performed.

When write accesses of at least two items of data among the first data to the sixth data crash, priority controller 11 performs priority control based on the value of the VC of the host that writes (such as the master portion of the host) or the device, and performs a control to write a single item of data selected according to the value of the VC to shared storage device 40.

For example, the hosts set the VCs of the master portions included in the own device based on the driving state of the vehicle and the VC setting table. The hosts set the VCs of devices 30 when the hosts access to devices 30. For example, first host 20A sets the VCs of devices 30 based on the driving state of the vehicle and the VC setting table. For example, first host 20A assigns "7" to the VC of NPU 33 when the current content of processing is event log recording, and assigns "6" to the VC of NPU 33 when the current content of processing is event recording. For example, first host 20A assigns "5" to the VC of NPU 33 when the current content of processing is full-time video recording, and assigns "2 to 4" to the VC of NPU 33 when the current content of processing is full-time log recording.

First host 20A assigns "0 to 1" to the VC according to the content of processing, for example, because the safety risk to GPU expander 34 in driving of the vehicle is low.

First host 20A assigns the VC according to the content of processing by a device connected via connector 35 to the device. For example, when functional expander 36 is a device for entertainment, first host 20A assigns "0 to 1" to the VC according to the content of processing because the safety risk in driving of the vehicle is low. For example, when functional expander 36 is a HW function extension device, first host 20A assigns the VC according to the safety risk in driving of the vehicle. When second host 20B accesses to devices 30, second host 20B also performs the same operations as those of first host 20A.

Here, the value of the VC assigned above is held in the DPs excluding the DP connected to shared storage device 40 until the VC assigned by the host is changed. Thereby, the VC is appropriately set during the access from device 30 to shared storage device 40, enabling priority control in priority controller 11 by the VC according to the present disclosure.

Unlike in device 30, assignment of the VC is unnecessary in the access from the host to shared storage device 40, because the value of the VC is set to the TC storing portion of the header during the access from the host to shared storage device 40.

Other Embodiments

As above, the data storage system and data storing method according to one or a plurality of aspects have been described based on the embodiment and the like, but the present disclosure is not limited to this embodiment and the like. The present disclosure may also cover a variety of modifications conceived by persons skilled in the art and performed on the present embodiment, and embodiments made of combinations of components in different embodiments without departing from the gist of the present disclosure.

For example, PCIe has been exemplified as the interface in the above embodiment and the like, but any other interface can be used. For example, Compute Express Link (CXL), Ethernet, or the like may be used as the interface, or another interface may be used. When CXL is used as the interface, the TC storing portion (TC field) of the header of the data may contain information indicating the priority degree of the data. In this case, first host 20A and second host 20B are components (e.g., circuits) that function as hosts in data communication (i.e., CXL communication) via a CXL bus, and correspond to root complex devices in the CXL standards, while first device 30A, second device 30B, and shared storage device 40 correspond to end-point devices in the CXL standards. For example, when communication between first host 20A and second host 20B and shared storage device 40 and communication between first device 30A and second device 30B and shared storage device 40 are performed in accordance with the CXL standards, the first priority degree and the second priority degree may be stored in the TC storing portion of the header of the data, and priority controller 11 may control write of the data to shared storage device 40 based on the first priority degree and the second priority degree stored in the TC storing portion of the data. Likewise, for example, when communication between first host 20A and second host 20B and shared storage device 40 and communication between first device 30A and second device 30B and shared storage device 40 are also performed in accordance with the PCI Express standards, the first priority degree and the second priority degree may be stored in the TC storing portion of the header of the data, and priority controller 11 may control write of the data to shared storage device 40 based on the first priority degree and the second priority degree stored in TC storing portion of the data. When Ethernet is used as the interface, priority code point (PCP) in Virtual LAN (VLAN), IP Precedence, or differentiated services code point (DSCP) contained in the header of the Ethernet frame may contain information indicating the priority degree of the data.

For example, when the priority controller outputs the data from each of the devices to the shared storage device, the priority controller in the above embodiment or the like may delete the value of the VC stored in the TC storing portion of the header of the data. This can slightly reduce the volume of the data.

In the above embodiment and the like, the components may be each configured of dedicated hardware, or may be implemented by executing software programs suitable for the components. The components may be implemented by a program executor, such as a CPU or a processor, which reads out and executes software programs recorded on a recording medium such as a hard disk or a semiconductor memory.

The order of the steps executed in the flowchart is illustrative for specific description of the present disclosure, and the steps can be executed in any other order than the above order. Moreover, part of the above steps may be executed simultaneously (concomitantly) with another step, or part of the above steps need not to be executed.

The division of the functional blocks in the block diagram is one example, and a plurality of functional blocks may be implemented as one functional block, one functional block may be divided into several functional blocks, or part of the functions may be distributed to another functional block. The functions in a plurality of functional blocks having similar functions may be processed concomitantly or in a time-sharing manner by a single item of hardware or software.

The data storage system according to the above embodiment and the like may be implemented as a single device, or may be implemented by a plurality of devices. When the data storage system is implemented by a plurality of devices, the components included in the data storage system may be distributed into the plurality of devices in any manner. When the data storage system is implemented by a plurality of devices, the communication method among the plurality of devices is not particularly limited, and may be wireless communication, or may be wired communication. Between devices, wireless communication and wired communication may be used in combination.

Alternatively, the components described in the above embodiment may be implemented as software, or may be implemented, typically, as LSI, which is an integrated circuit. These may be individually formed into a single chip, or part or all of the components may be formed into a single chip to include these. Here, LSI is described as one example. Depending on the difference in integration density, the integrated circuit may also be referred to as IC, system LSI, super LSI, or ultra LSI in some cases. The formation of the integrated circuit is not limited to LSI, and the integrated circuit may be implemented by a dedicated circuit (e.g., a general-purpose circuit that executes dedicated programs) or a general-purpose processor. A FIGeld Programmable Gate Array (FPGA) which is programmable after production of LSI or a reconfigurable processor which enables reconfiguration of connection or setting of circuit cells within LSI after production of the LSI may also be used. Further, if an integrated circuit forming technique replacing LSI due to progress of the semiconductor technique or another technique derived therefrom appears, naturally, the integration of components may be performed using the technique.

The system LSI is super multifunction LSI manufactured by integrating a plurality of processors on a single chip, and specifically is a computer system including and configured of a microprocessor, a read only memory (ROM), a random access memory (RAM), and the like. The ROM stores a computer program. The microprocessor operates according to the computer program, and thereby the system LSI achieves the functions.

One aspect of the present disclosure may be a computer program for causing a computer to execute characteristic steps included in the data storing method illustrated in one of FIGS. 2, 4, and 5.

For example, the program may be a program to be executed by a computer. Alternatively, one aspect of the present disclosure may be a non-transitory computer-readable recording medium on which such a program is recorded. For example, such a program maybe recorded on a recording medium, which may be distributed or circulated. For example, a distributed program is installed on a device including another processor, and is executed by the processor. This can cause the device to perform the processing described above.

APPENDIX (Technique 1) Data storage system 1 provided in a mobile entity which is a data storage system provided in a mobile entity, the data storage system including: a shared storage device; a control device capable of writing to the shared storage device (such as first host 20A); one or more devices each capable of writing data to the shared storage device without the control device (such as first device 30A and second device 30B); and a priority controller that is connected between (i) the control device and (ii) the one or more devices and the shared storage device to perform control concerning write of data from the control device and the one or more devices to the shared storage device based on a first priority degree (such as VC) set to the control device or a second device included in the one or more devices and a second priority degree (such as VC) that is set by the control device and indicates a priority degree of write by a first device included in the one or more devices.

Thereby, the second priority degree is set to first device 30A by the control device. Thus, when the write access from the control device or second device 30B and the write access from first device 30A crash, priority controller 11 can determine, based on the first priority degree and the second priority degree, which data is written with priority to shared storage device 40. Accordingly, when the write access from the control device or second device 30B and the write access from first device 30A crash, data storage system 1 can suppress loss of the data concerning the driving of the vehicle.

(Technique 2) Data storage system 1 according to technique 1, wherein when a simultaneous data write access to the shared storage device occurs from the control device and the first device, the priority controller selects one of the control device or the first device based on the first priority degree and the second priority degree set to the control device, and writes data of the one selected, with priority, to the shared storage device.

Thereby, when the access write from the control device and the write access from first device 30A crash, data storage system 1 can suppress loss of the data concerning the driving of the vehicle based on the first priority degree and the second priority degree.

(Technique 3) Data storage system 1 according to technique 1, wherein the control device sets the first priority degree to the second device, the first priority degree indicating a priority degree of write by the second device, and when a simultaneous data write access to the shared storage device occurs from the first device and the second device, the priority controller selects one of the first device or the second device based on the first priority degree and the second priority degree, and writes data of the one selected, with priority, to the shared storage device.

Thereby, the first priority degree is set to second device 30B by the control device. Thus, when the write access from first device 30A and the write access from second device 30B crash, data storage system 1 can suppress loss of the data concerning the driving of the vehicle based on the first priority degree and the second priority degree.

(Technique 4) Data storage system 1 according to any one of techniques 1 to 3, wherein the control device assigns a content of processing to be executed by the first device, based on a state of the mobile entity, and sets the second priority degree to the first device according to the content of processing assigned.

Thereby, the control device can set the second priority degree to first device 30A according to the state of the mobile entity. For example, when the state of the mobile entity indicates a state of a high safety risk in moving, the control device can suppress loss of data with a high safety risk in moving of the mobile entity by setting the second priority degree to be high.

(Technique 5) Data storage system 1 according to technique 4, wherein the control device determines, based on the state of the mobile entity, whether to change the content of processing to be executed by the first device, and when the control device determines to change the content of processing, the control device further updates the second priority degree according to the content of processing after the change.

Thereby, the content of processing by first device 30A is changed, followed by update of the second priority degree (such as the VC). Thus, the second priority degree can be set to first device 30A according to the state of the mobile entity. Accordingly, the determination (priority control) by priority controller 11 when write accesses crash can be more accurately performed.

(Technique 6) Data storage system 1 according to any one of techniques 1 to 5, including: a switch including the priority controller, wherein the switch includes: an upstream port connected to the control device; and a downstream port that is connected to the first device and stores the second priority degree.

Thereby, when the write access from the control device connected to the upstream port and the write access from first device 30A connected to the downstream port crash, loss of the data concerning the driving of the vehicle can be suppressed.

(Technique 7) Data storage system 1 according to any one of techniques 1 to 6, wherein the first device performs direct memory access (DMA) transfer of the data to the shared storage device.

Thereby, even when first device 30A communicates using a transfer method without using the VC, such as DMA transfer, in communication, the second priority degree is set to first device 30A by the control device, thus ensuring a suppression in loss of the data concerning the driving of the vehicle.

(Technique 8) Data storage system 1 according to any one of techniques 1 to 7, wherein the control device is a root complex device in PCI Express standards, and the first device is an end-point device in the PCI Express standards.

Thereby, when the write access from the root complex device and the write access from the end-point device crash while PCI Express is used as the interface, loss of the data concerning the driving of the vehicle can be suppressed.

(Technique 9) Data storage system 1 according to any one of techniques 1 to 7, wherein the control device and the one or more devices communicate with the shared storage device in accordance with PCI Express standards, the first priority degree and the second priority degree are stored in a TC storing portion of a header of the data, and the priority controller controls write of the data to the shared storage device based on the first priority degree and the second priority degree stored in the TC storing portion of the data.

Thereby, when the write access from the control device and the write access(es) from the one or more devices crash while communication is performed in accordance with the PCI Express standards, loss of the data can be suppressed.

(Technique 10) Data storage system 1 according to any one of techniques 1 to 7, wherein the control device is a root complex device in Compute Express Link (CXL) standards, and the first device is an end-point device in the CXL standards.

Thereby, when the write access from the root complex device and the write access from the end-point device crash while CXL is used as the interface, loss of the data concerning the driving of the vehicle can be suppressed.

(Technique 11) Data storage system 1 according to any one of techniques 1 to 7, wherein the control device and the one or more devices communicate with the shared storage device in accordance with CXL standards, the first priority degree and the second priority degree are stored in a TC storing portion of a header of the data, and the priority controller controls write of the data to the shared storage device based on the first priority degree and the second priority degree stored in the TC storing portion of the data.

Thereby, when the write access from the control device and the write access from the one or more devices crash while communication is performed in accordance with the CXL standards, loss of the data can be suppressed.

(Technique 12) Data storage system 1 according to any one of techniques 1 to 9, wherein the first device includes at least one of a camera, a sonar, a network, or general-purpose computing on graphics processing units (GPGPU).

Thereby, loss of at least one item of data of the camera, the sonar, the network, or the GPGPU provided in the mobile entity can be suppressed.

(Technique 13) Data storage system 1 according to any one of techniques 1 to 10, including a memory that stores a shared table for setting the first priority degree and the second priority degree.

Thereby, using the table, the control device can easily set the first priority degree and the second priority degree.

(Technique 14) A data storing method to be executed by a data storage system provided in a mobile entity, the data storage system including a shared storage device, a control device capable of writing to the shared storage device (such as first host 20A), and one or more devices each capable of writing data to the shared storage device without the control device (such as first device 30A and second device 30B), the data storing method including: performing control concerning write of data from the control device and the one or more devices to the shared storage device based on a first priority degree set to the control device or a second device included in the one or more devices and a second priority degree that is set by the control device and indicates a priority degree of write by a first device included in the one or more devices.

Thereby, the same effects as those of data storage system 1 can be obtained.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2023-213752 filed on Dec. 19, 2023, and Japanese Patent Application No. 2024-104845 filed on Jun. 28, 2024.

INDUSTRIAL APPLICABILITY

The present disclosure is useful for data storage systems and the like that store data to be obtained by mobile entities such as vehicles.

The invention claimed is:

1. A data storage system provided in a mobile entity, the data storage system comprising:

a shared storage device;

a control device capable of writing to the shared storage device;

one or more devices each capable of writing data to the shared storage device without the control device; and a priority controller that is connected between (i) the control device and (ii) the one or more devices and the shared storage device to perform control concerning write of data from the control device and the one or more devices to the shared storage device based on a first priority degree set to the control device or a second device included in the one or more devices and a second priority degree that is set by the control device for write by a first device included in the one or more devices, wherein the control device assigns a content of processing to be executed by the first device, based on a state of the mobile entity, and sets the second priority degree to the first device according to the content of processing assigned.

2. The data storage system according to claim 1, wherein when a simultaneous data write access to the shared storage device occurs from the control device and the first device, the priority controller selects one of the control device or the first device based on the first priority degree and the second priority degree set to the control device, and writes data of the one selected, with priority, to the shared storage device.

3. The data storage system according to claim 1, wherein the control device sets the first priority degree to the second device, the first priority degree being for write by the second device, and when a simultaneous data write access to the shared storage device occurs from the first device and the second device, the priority controller selects one of the first device or the second device based on the first priority degree and the second priority degree, and writes data of the one selected, with priority, to the shared storage device.

4. The data storage system according to claim 1, wherein the control device determines, based on the state of the mobile entity, whether to change the content of processing to be executed by the first device, and when the control device determines to change the content of processing, the control device updates the second priority degree according to the content of processing after the change.

5. The data storage system according to claim 1, further comprising:

a switch including the priority controller, wherein the switch includes:

an upstream port connected to the control device; and a downstream port that is connected to the first device and stores the second priority degree.

6. The data storage system according to claim 1, wherein the first device performs direct memory access (DMA) transfer of the data to the shared storage device.

7. The data storage system according to claim 1, wherein the control device is a root complex device in Peripheral Component Interconnect express (PCIe) standards, and the first device is an end-point device in the PCIe standards.

8. The data storage system according to claim 1, wherein the control device is a root complex device in Compute Express Link (CXL) standards, and the first device is an end-point device in the CXL standards.

9. The data storage system according to claim 1, wherein the control device and the one or more devices communicate with the shared storage device in accordance with Compute Express Link (CXL) standards, the first priority degree and the second priority degree are stored in a Traffic Class (TC) storing portion of a header of the data, and the priority controller controls the write of the data to the shared storage device based on the first priority degree and the second priority degree stored in the TC storing portion of the header of the data.

10. The data storage system according to claim 1, wherein the first device includes at least one of a camera, a sonar, a network, or general-purpose computing on graphics processing units (GPGPU).

11. The data storage system according to claim 1, further comprising:

a memory that stores a shared table for setting the first priority degree and the second priority degree.

12. A data storage system provided in a mobile entity, the data storage system comprising:

a shared storage device;

a control device capable of writing to the shared storage device;

one or more devices each capable of writing data to the shared storage device without the control device; and a priority controller that is connected between (i) the control device and (ii) the one or more devices and the shared storage device to perform control concerning write of data from the control device and the one or more devices to the shared storage device based on a first priority degree set to the control device or a second device included in the one or more devices and a second priority degree that is set by the control device for write by a first device included in the one or more devices, wherein the control device and the one or more devices communicate with the shared storage device in accordance with Peripheral Component Interconnect express (PCIe) standards, the first priority degree and the second priority degree are stored in a Traffic Class (TC) storing portion of a header of the data, and the priority controller controls the write of the data to the shared storage device based on the first priority degree and the second priority degree stored in the TC storing portion of the header of the data.

13. A data storing method to be executed by a data storage system provided in a mobile entity, the data storage system including:

a shared storage device;

a control device capable of writing to the shared storage device;

one or more devices each capable of writing data to the shared storage device without the control device; and a priority controller that is connected between (i) the control device and (ii) the one or more devices and the shared storage device, the data storing method comprising:

performing, by the priority controller, control concerning write of data from the control device and the one or more devices to the shared storage device based on a first priority degree set to the control device or a second device included in the one or more devices and a second priority degree that is set by the control device for write by a first device included in the one or more devices, wherein the control device assigns a content of processing to be executed by the first device, based on a state of the mobile entity, and sets the second priority degree to the first device according to the content of processing assigned.

* * * * *